(12) United States Patent
Subbiah et al.

(10) Patent No.: US 10,630,640 B1
(45) Date of Patent: Apr. 21, 2020

(54) VARIABLE LENGTH FIELD FIBRE CHANNEL ADDRESS SYSTEM

(71) Applicant: Dell Products L.P., Round Rock, TX (US)

(72) Inventors: Raja Subbiah, Tamil Nadu (IN); Kavitha Kuppusamy, Tamil Nadu (IN); Sakti Lakshmiy R. Paulchamy, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/258,437

(22) Filed: Jan. 25, 2019

(51) Int. Cl.
| | |
|---|---|
| *H04L 29/12* | (2006.01) |
| *H04L 12/751* | (2013.01) |
| *H04Q 11/00* | (2006.01) |
| *H04L 12/931* | (2013.01) |
| *H04B 10/00* | (2013.01) |
| *H04B 10/25* | (2013.01) |
| *H04B 10/43* | (2013.01) |
| *H04B 10/60* | (2013.01) |

(Continued)

(52) U.S. Cl.
CPC .......... *H04L 61/6045* (2013.01); *H04L 45/02* (2013.01); *H04L 49/357* (2013.01); *H04Q 11/0005* (2013.01); *H04B 10/00* (2013.01); *H04B 10/12* (2013.01); *H04B 10/14* (2013.01); *H04B 10/142* (2013.01); *H04B 10/152* (2013.01); *H04B 10/225* (2013.01); *H04B 10/25* (2013.01); *H04B 10/2503* (2013.01); *H04B 10/40* (2013.01); *H04B 10/43* (2013.01); *H04B 10/50* (2013.01); *H04B 10/60* (2013.01)

(58) Field of Classification Search
None
See application file for complete search history.

(56) References Cited

U.S. PATENT DOCUMENTS

| | | | |
|---|---|---|---|
| 9,450,877 B1 * | 9/2016 | Kamisetty | H04L 47/125 |
| 2002/0034178 A1 * | 3/2002 | Schmidt | H04L 29/12009 370/386 |

(Continued)

OTHER PUBLICATIONS

"Fibre Channel Physical and Signaling Interface (FC-PH)", dated Jun. 1, 1994, American National Standards Institute, X3T11/ Project 755D/Rev 4.3 (Year: 1994).*

(Continued)

*Primary Examiner* — Darren E Wolf
(74) *Attorney, Agent, or Firm* — Haynes and Boone, LLP

(57) ABSTRACT

A variable length field FC address system includes a source device coupled to a target device via an FC fabric. A first FC switch device identifies a number of FC switch devices in the FC fabric, a number of links provided by each FC switch device, a number of sessions required by each link, and then allocates unique FC addresses to the FC switch devices. Each unique FC address associated with an FC switch device includes a domain identifier provided by a first number of bits based on the number of FC switch devices in the FC fabric, an area identifier provided by a second number of bits based on the number of links provided by that FC switch device, and a session identifier provided by a third number of bits based on the number of sessions required by the link provided by that FC switch device.

20 Claims, 8 Drawing Sheets

(51) Int. Cl.
*H04B 10/40* (2013.01)
*H04B 10/50* (2013.01)

(56) References Cited

U.S. PATENT DOCUMENTS

| | | | | |
|---|---|---|---|---|
| 2003/0084219 A1* | 5/2003 | Yao | ............... | H04L 29/06 |
| | | | | 710/300 |
| 2003/0131179 A1* | 7/2003 | Ajanovic | ............. | G06F 13/362 |
| | | | | 710/316 |
| 2004/0017771 A1* | 1/2004 | Martin | ................ | H04L 49/357 |
| | | | | 370/229 |

OTHER PUBLICATIONS

"Fibre Channel Framing and Signaling—4 (FC-FS-4)", Rev 1.41, Jun. 28, 2016, American National Standard for Information Technology, T11/16-291v0 (Year: 2016).*

Zoltán Meggyesi entitled Fibre Channel Overview, KFKI—RMKI, Research Institute for Particle and Nuclear Physics, H-1525 Budapest, POB 49, Hungary, (http://hsi.web.cern.ch/HSI/fcs/spec/overview.htm), Aug. 15, 1994 (Year: 1994).*

* cited by examiner

VARIABLE LENGTH FIELD FIBRE CHANNEL ADDRESS SYSTEM

BACKGROUND

The present disclosure relates generally to information handling systems, and more particularly to providing variable length field Fibre Channel addresses for use in routing information between information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, source devices provided by server devices, sometimes store and retrieve data in target devices included in Storage Area Networks (SANs), and those source server devices are coupled to the target devices in the SAN via a Fibre Channel (FC) fabric that includes a plurality of FC switch devices. The FC switch devices in the FC fabric utilize FC addresses to route data packets received from a source server device to a particular target device, with the FC address identifying a particular FC switch device that is directly coupled to the target device to which the data packet is directed, which allows any of the FC switch devices in the FC fabric to route that data packet through the FC fabric to that particular FC switch device so that it may be provided to the target device. Conventional FC addresses are provided with 24 bits, with a first byte (8 bits) dedicated to a domain identifier that may be used to identify each FC switch device in the FC fabric, a second byte (8 bits) dedicated to an area identifier that may be used to identify each port/link in an FC switch device, and a third byte (8 bits) dedicated to an session identifier that may be used to identify each session provided via a port/link in an FC switch device.

The use of conventional FC addresses provides limits on FC fabrics. For example, FC fabrics are limited to 239 domains/FC switch devices, as the 1 byte/8 bits of the FC address dedicated to the domain identifier provide 256 possible domain identifiers ($2^8$=256), with 17 of those domain identifiers (00 and 0xF0-0xFF) reserved. Similarly, the FC switch devices in the FC fabric are each limited to 256 ports/links, as the 1 byte/8 bits of the FC address dedicated to the area identifier provide 256 possible area identifiers ($2^8$=256), and any port/link provided by the FC switch devices in the FC fabric is limited to providing 256 sessions (e.g., with target devices), as the 1 byte/8 bits of the FC address dedicated to the session identifier provide 256 possible session identifiers ($2^8$=256).

Accordingly, it would be desirable to provide an improved FC address system.

SUMMARY

According to one embodiment, an Information Handling System (IHS) includes a processing system; and a memory system that is coupled to the processing system and that includes instructions that, when executed by the processing system, cause the processing system to provide a Fibre Channel (FC) switch engine that is configured to: identify a number of FC switch devices in an FC fabric; identify a number of links provided by each FC switch device in the FC fabric; identify a number of sessions required by each link provided by each FC switch device in the FC fabric; and allocate a plurality of unique FC addresses to the plurality of FC switch devices, wherein each respective unique FC address includes: a domain identifier that is provided by a first number of bits based on the number of FC switch devices in the FC fabric; an area identifier that is provided by a second number of bits based on the number of links provided by the FC switch device associated with that respective unique FC address; and a session identifier that is provided by a third number of bits based on the number of sessions required by the link provided by the FC switch device associated with that respective unique FC address.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
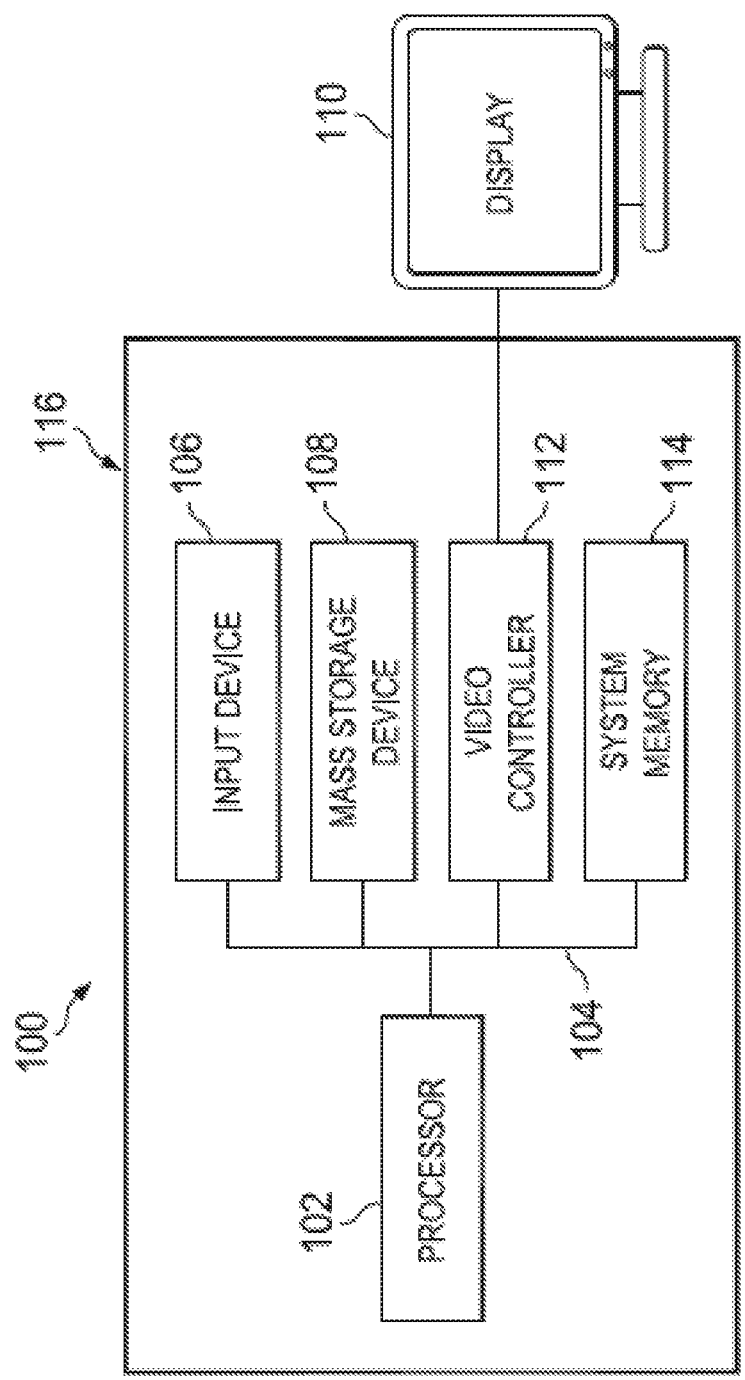
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
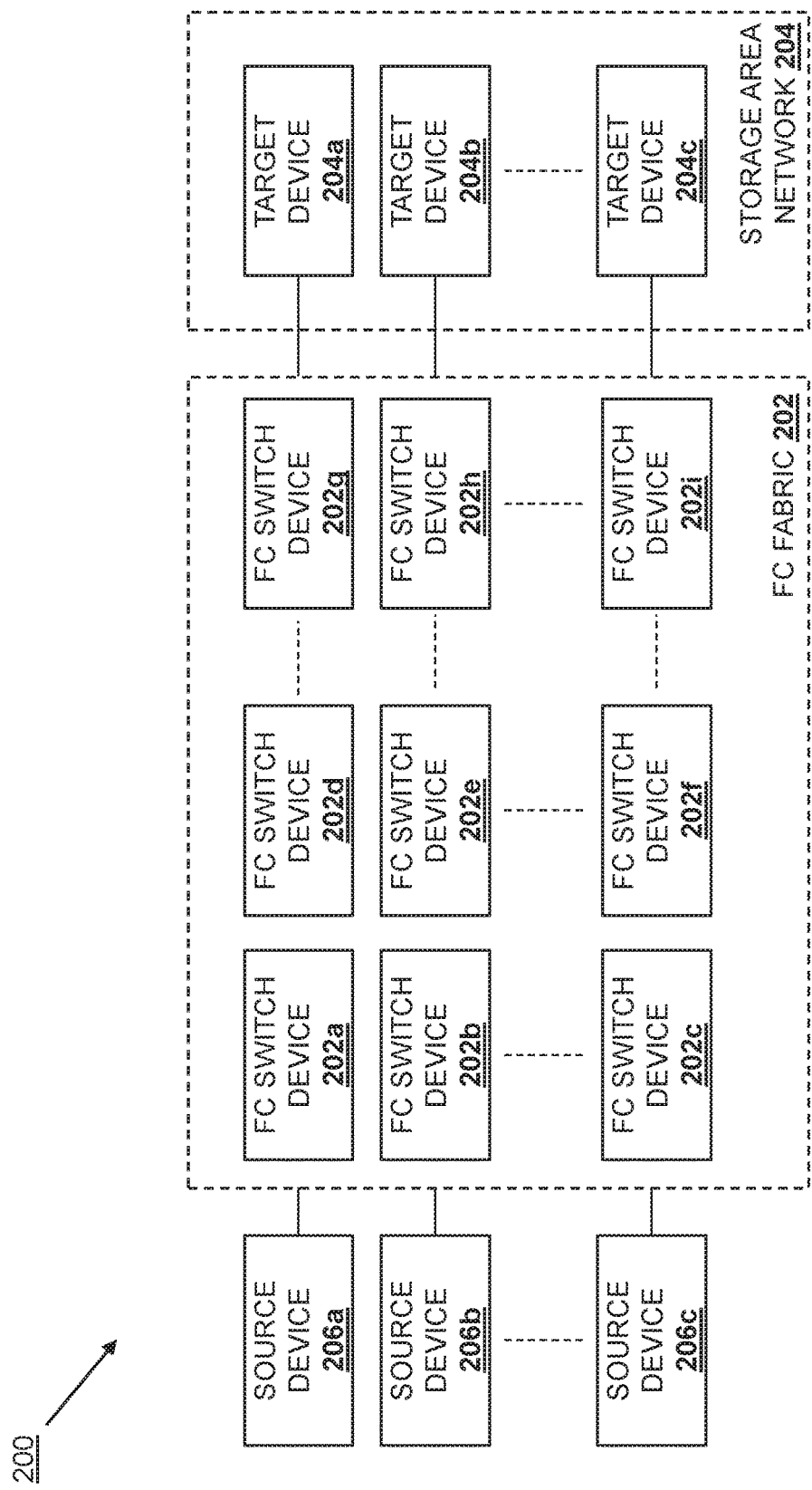
FIG. 2 is a schematic view illustrating an embodiment of a variable length field FC address system.

Referring now to FIG. 2, an embodiment of a variable length field Fibre Channel (FC) address system 200 is illustrated. In the illustrated embodiment, the variable length field FC address system 200 includes an FC fabric 200 having a plurality of FC switch devices such as the FC switch devices 202a, 202b, and up to 202c; the FC switch devices 202d, 202e, and up to 202f; and up to the FC switch devices 202g, 202h, and up to 202i. Any or all of the FC switch devices 202a-i may be provided by the IHS 100 discussed above with reference to FIG. 1, and/or may include some or all of the components of the IHS 100. As will be understood by one of skill in the art in possession of the present disclosure, the FC switch devices in the FC fabric 202 may be coupled together in a variety of manners, and each be configured to route FC data packets using the unique FC addresses described below. In the illustrated embodiment, the variable length field FC address system 200 also includes a Storage Area Network (SAN) 204 that is coupled to the FC fabric 202 and that includes a plurality of target devices such as the target device 204a, the target device 204b, and up to the target device 204c. Any or all of the target devices 204a-c in the SAN 204 may be provided by the IHS 100 discussed above with reference to FIG. 1, and/or may include some or all of the components of the IHS 100. As will be understood by one of skill in the art in possession of the present disclosure, the target devices in the SAN 204 may be provided by a variety of storage devices known in the art that are configured to store data.

In the illustrated embodiment, the variable length field FC address system 200 also includes a plurality of source devices such as the source device 206a, the source device 206b, and up to the source device 206c. Any or all of the source devices 206a-c may be provided by the IHS 100 discussed above with reference to FIG. 1, and/or may include some or all of the components of the IHS 100. In the examples provided below, the source devices are provided by server devices and/or other computing devices known in the art, although one of skill in the art in possession of the present disclosure will recognize that the source devices may be provided by virtually any data source known in the art. While a specific variable length field FC address system 200 has been illustrated and described, one of skill in the art in possession of the present disclosure will recognize that datacenters and/or other systems providing networking fabrics may benefit from the teachings of the present disclosure and thus will fall within the scope of the present disclosure as well.

Figure 3:
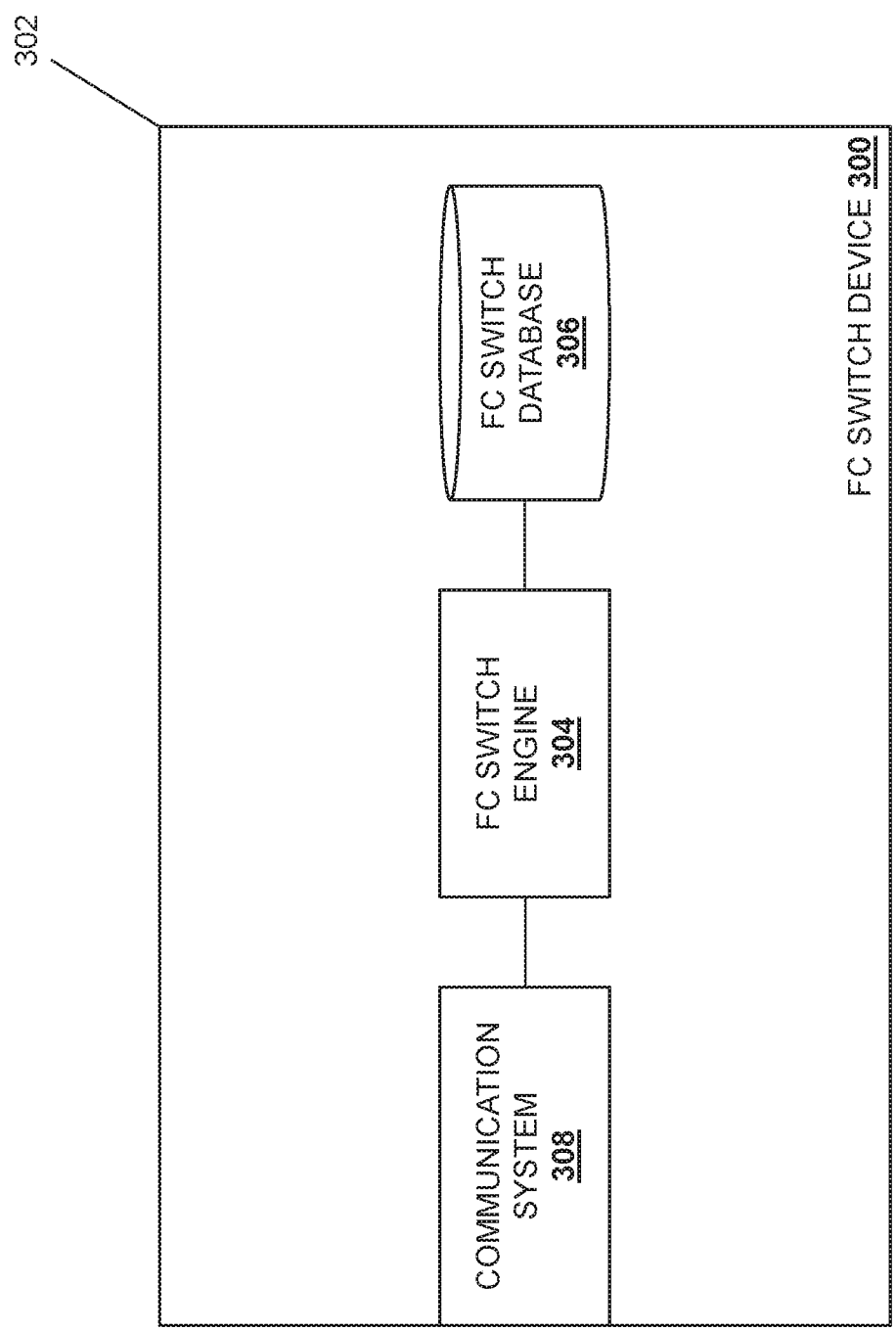
FIG. 3 is a schematic view illustrating an embodiment of an FC switch device that may be provided in the variable length field FC address system of FIG. 2.

Referring now to FIG. 3, an embodiment of an FC switch device 300 is illustrated that may be provided in the variable length field FC address system 200 as any or all of the FC switch devices 202a-i in the FC fabric 202 of FIG. 2. As such, the FC switch device 300 may be provided by the IHS 100 discussed above with reference to FIG. 1 and/or may include some or all of the components of the IHS 100, and in specific examples may be provided by a networking device that is configured to route FC data packets between the source devices discussed herein to the target devices discussed herein. In the illustrated embodiment, the FC switch device 300 includes a chassis 302 that houses the components of the FC switch device 300, only some of which are illustrated in FIG. 3. For example, the chassis 302 may house a processing system (not illustrated, but which may include the processor 102 discussed above with reference to FIG. 2) and a memory system (not illustrated, but which may include the memory 114 discussed above with reference to FIG. 2) that is coupled to the processing system and that includes instructions that, when executed by the processing system, cause the processing system to provide an FC switch engine 304 that is configured to perform the functionality of the FC switch engines and FC switch devices discussed below.

The chassis 302 may also house a storage system (not illustrated, but which may include the storage device 108 discussed above with reference to FIG. 1) that is coupled to the FC switch engine 304 (e.g., via a coupling between the processing system and the storage system) and that includes an FC switch database 306 that is configured to store any or all of the data utilized by the FC switch engines and FC switch devices discussed above. The chassis 302 may also house a communication system 308 that is coupled to the FC switch engine 304 (e.g., via a coupling between the processing system and the communication system 308) and that may include a Network Interface Controller (NIC), a wireless communication system (e.g., a WiFi communication system, a BLUETOOTH® communication system, a Near Field Communication (NFC) system, and/or other wireless communication components known in the art), and/or other communication subsystems that would be apparent to one of skill in the art in possession of the present disclosure. In particular, the communication system 308 may include any communication components that enable the transmission of the FC data packets via he unique FC addresses described in the examples provided below. While a specific FC switch device has been illustrated and described, one of skill in the art in possession of the present disclosure will recognize that FC switch devices may include a variety of components for performing conventional FC switch functionality, as well as the functionality discussed below, while remaining within the scope of the present disclosure.

Figure 4:
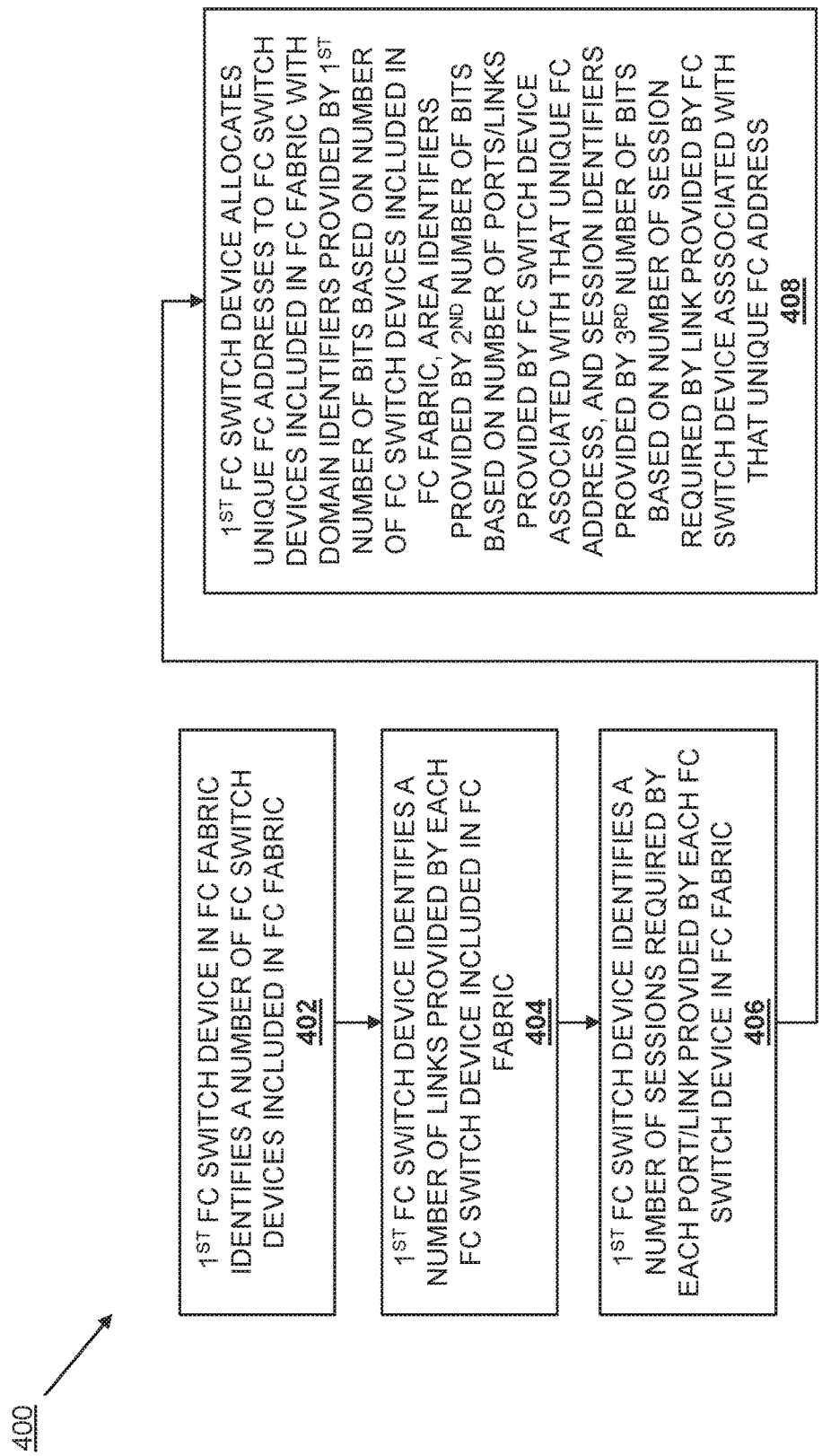
FIG. 4 is a flow chart illustrating an embodiment of a method for providing unique FC addresses using the variable length field FC address system of the present disclosure.

Referring now to FIG. 4, an embodiment of a method 400 for providing unique FC addresses via the variable length field FC address system of the present disclosure is illustrated. As discussed below, the systems and methods of the present disclosure provide for the allocation of unique FC addresses to each of the FC switch devices in an FC fabric with domain identifiers, area identifiers, and sessions identifiers that may be defined by a variable number of bits depending on the number of FC switch devices in the FC fabric, the number of ports/links provided by the FC switch device associated with the FC address, and the number of sessions required by the link provided by the FC switch devices associated with the FC address. For example, a first FC switch device in an FC fabric may communicate with each of the other FC switch devices in the FC fabric in order to determine a number of FC switch devices in the FC fabric. In addition, those communications allow the first FC switch device to determine a number of ports/links provided by each of those FC switch devices in the FC fabric, and a number of session required by each link provided by those FC switch devices in the FC fabric.

As such, for any particular FC switch device, a unique FC address may be allocated that includes a domain identifier defined by a first number of bits that is based on the number of FC switch devices in the FC fabric, an area identifier defined by a second number of bits that is based on the number of links/ports that are provided by that FC switch device, and a number of sessions required by the link on that FC switch device for which the FC address is being allocated. Thus, in a specific example, an FC switch device that is included in the FC fabric and that provides more than 256 ports/links may be allocated an FC address with a domain identifier defined by 4 bits, an area identifier defined by 12 bits (allowing 4096 possible ports/links to be identified on that FC switch device), and a session identifier defined by 8 bits. Similarly, an FC switch device may be coupled to an N_Port Identifier Virtualization (NPIV) Proxy Gateway (NPG) device in an FC fabric, with the NPG device supporting more than 256 sessions with its connected devices, and that FC switch device may be allocated an FC address with a domain identifier defined by 4 bits, an area identifier defined by 8 bits, and a session identifier defined by 12 bits (allowing 4096 possible sessions to be identified on that FC switch device/NPG device). As such, unique FC addresses may have the length of their fields (i.e., the domain identifiers, area identifiers, and session identifiers discussed above) varied based on the needs of each FC switch device associated with those FC addresses, providing flexibility to use the FC address space more efficiently.

The method 400 begins at block 402 where a first FC switch device in an FC fabric identifies a number of FC switch devices included in the FC fabric. In an embodiment, at block 402, one of the FC switch devices in the FC fabric 202 (e.g., the FC switch device 202a in the examples below) may operate as a "master" FC switch devices that commu-nicates with the other FC switch devices in the FC fabric 202 (e.g., the switch devices 202b-i in the examples below) in order to determine the details of the FC fabric 202 discussed below. For example, the FC switch device 202a may operate (e.g., using mechanisms defined by the InterNational Committee for Information Technology Standards (INCITS) in T11 FC-SW6 or other T11 FC-SW versions) in order retrieve any of the information discussed below from each of the FC switch devices 202b-i. Thus, at block 402, the FC switch engine 304 in the first FC switch device 202a/300 may communicate (via its communication system 308) with each of the FC switch devices 202b-i (e.g., via their respective FC switch engines 304 and communication systems 308) and, in response, may utilize those communications to determine a number of FC switch devices included in the FC fabric 202. For example, one of skill in the art in possession of the present disclosure will recognize that conventional systems do not provide a direct method to determine a number of FC switch devices in an FC fabric before FC address assignment has been performed, so the number of FC switch devices may be determined via configuration information provided via future expansions of configuration information available via the FC fabric. Furthermore, in some examples, the number of FC switch devices may be provided by a network administrator as configuration information for the FC fabric, which may be adjusted as the number of FC switch devices in the FC fabric changes. However, one of skill in the art in possession of the present disclosure will recognize that the number of FC switch devices in the FC fabric may be made available to the first FC switch device in a variety of manners that will fall within the scope of the present disclosure as well.

In some of the specific examples below, the FC fabric 202 may be relatively small and include 16 or fewer FC switch devices. In some of the specific examples below, the FC fabric 202 may be relatively conventional and include 256 or fewer FC switch devices. In some of the specific examples below, the FC fabric 202 may be relatively large and include more than 256 FC switch devices. However, while the examples below provide domain identifiers defined by either 4 bits (e.g., 16 different values to identify up to 16 different switches) or 8 bits (e.g., 256 different values to identify up to 256 different switches), relatively large FC fabrics may be provided domain identifiers defined by 12 bits (e.g., 4096 different values to identify up to 4096 different switches), and one of skill in the art will recognize that the variable length fields of the FC addresses of the present disclosure may provide domain identifiers defined by any number of bits (e.g., 1-3 bits, 5-7 bits, 9-11 bits, 12+ bits) needed to provide a number of different values corresponding to the number of FC switch devices in the FC fabric 202 while remaining within the scope of the present disclosure as well.

The method 400 then proceeds to block 404 where the first FC switch device identifies a number of links provided by each FC switch device included in the FC fabric. In an embodiment, at block 404, the FC switch engine 304 in the first FC switch device 202a/300 may use the communications with each of the FC switch devices 202b-i to determine a number of ports/links provided by each FC switch device included in the FC fabric 202. For example, one of skill in the art in possession of the present disclosure will recognize that conventional systems do not provide a direct method to determine a number of links/ports provided by FC switch devices, so the number of links/ports provided by the FC switch devices may be determined via configuration information provided in future expansions of configuration information available for FC switch devices, which may then be communicated by those FC switch devices to the master FC switch device accordingly. Furthermore, in some examples, the number of links/ports provided by an FC switch device may be provided by a network administrator as configuration information for the FC switch device, which may be adjusted as the number of links/ports provided by the FC switch device changes. However, one of skill in the art in possession of the present disclosure will recognize that the number of links/ports provided by an FC switch device may be made available to the first FC switch device in a variety of manners that will fall within the scope of the present disclosure as well.

In some of the specific examples below, any particular FC switch device may have a relatively low link/port density of 16 or fewer links/ports. In some of the specific examples below, any particular FC switch device may have a relatively conventional link/port density of 256 or fewer links/ports. In some of the specific examples below, any particular FC switch device may have a relatively high link/port density of greater than 256 links/ports. However, while the examples below provide area identifiers defined by either 8 bits (e.g., 256 different values to identify up to 256 different links/ports on an FC switch device) or 12 bits (e.g., 4096 different values to identify up to 4096 different links/ports on an FC switch device), FC switch devices with relatively low port densities may be provided area identifiers defined by 4 bits (e.g., 16 different values to identify up to 16 different links/ports on an FC switch device), and one of skill in the art will recognize that the variable length fields of the FC addresses of the present disclosure may provide area identifiers defined by any number of bits (e.g., 1-3 bits, 5-7 bits, 9-11 bits, 12+ bits) needed to provide a number of different values corresponding to the number of links on an FC switch device while remaining within the scope of the present disclosure as well.

The method 400 then proceeds to block 406 where the first FC switch device identifies a number of session required by each link provided by each FC switch device included in the FC fabric. In an embodiment, at block 406, the FC switch engine 304 in the first FC switch device 202a/300 may use the communications with each of the FC switch devices 202b-i to determine a number of sessions required by each port/link provided by each FC switch device included in the FC fabric 202. For example, the number of sessions required by each port/link provided on an FC switch device may be estimated or predicted based on a configuration of that FC switch device, and provided by that FC switch device to the master FC switch device accordingly. Furthermore, in some examples, the number of sessions required by link/ports provided by an FC switch device may be provided by a network administrator as configuration information for the links/ports, which may be adjusted as the number of sessions required by links/ports changes. However, one of skill in the art in possession of the present disclosure will recognize that the number of sessions required by the links/ports provided by an FC switch device may be made available to the first FC switch device in a variety of manners that will fall within the scope of the present disclosure as well.

In some of the specific examples below, a port/link on any particular FC switch device may a relatively low session requirement of 16 or fewer sessions. In some of the specific examples below, a port/link on any particular FC switch device may have a conventional session requirement of 256 or fewer sessions. In some of the specific examples below, a port/link on any particular FC switch device may a relatively high session requirement of greater than 256 sessions. However, while the examples below provide session identifiers defined by either 8 bits (e.g., 256 different values to identify up to 256 different sessions for a port/link on an FC switch device) or 12 bits (e.g., 4096 different values to identify up to 4096 different sessions on a port/link on an FC switch device), ports/links with relatively low session requirements may be provided sessions identifiers defined by 4 bits (e.g., 16 different values to identify up to 16 different sessions for a port/link on an FC switch device), and one of skill in the art will recognize that the variable length fields of the FC addresses of the present disclosure may provide session identifiers defined by any number of bits (e.g., 1-3 bits, 5-7 bits, 9-11 bits, 12+ bits) needed to provide a number of different values corresponding to the number of sessions required for a link/port on an FC switch device while remaining within the scope of the present disclosure as well The method 400 then proceeds to block 408 where the first FC switch device allocates unique FC addresses to the FC switch devices included in the FC fabric with domain identifiers provided by a first number of bits based on the number of FC switch devices included in the FC fabric, area identifiers provided by a second number of bits based on a number of links provided by the FC switch device associated with that unique FC address, and session identifiers provided by a third number of bits based on the number of sessions required by the link provided by the FC switch device associated with that unique FC address. In an embodiment, at block 408, the FC switch engine 304 in the first FC switch device 202a/300 may operate to allocate unique FC addresses to the FC switch devices 202a-i, and may vary the length of the fields in those unique FC addresses to provide domain identifiers, area identifiers, and session identifiers that are defined by a number of bits that allow for a number of possible values that is sufficient to identify the number of FC switch devices in the FC fabric 202, the number of link/ports provided by the FC switch device associated with that unique FC address, and the number of sessions required by the link/port provided by the FC switch device associated with that unique FC address.

Figure 5A:
FIG. 5A is a schematic view of a plurality of FC switch devices that may be provided unique FC addresses using the variable length field FC address system of the present disclosure.
Figure 5A:
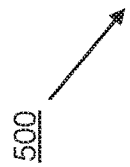

For example, FIG. 5A illustrates a portion of an FC fabric 500 (which may be the FC fabric 202 of FIG. 2) that includes a plurality of FC switch devices 502, 504, and 506 (which may be any of the FC switch devices 202a-i of FIG. 2). At block 402 of the method 400, the FC fabric may be identified as relatively small and including 16 or less FC switch devices, while the link/port density of the FC switch device 504 may be identified as relatively high and having more than 256 links/ports. For example, the FC switch device 504 may be a high link/port density FC switch device that provides more than 256 link/port, each of which should be mapped to an area identifier, and thus conventional 8-bit area identifiers utilized in conventional FC address systems are not sufficient to identify each of the links provided by FC switch device 504. In response to such link/port requirements for the FC switch device 504, the FC switch engine 304 in the FC switch device 202a may allocate unique FC address(es) for each of the FC switch devices 502, 504, and 506, with each unique FC address each having a domain identifier defined by 4 bits (i.e., capable of identifying each of the FC switch devices in the relatively small FC fabric 500 with 16 or less FC switch devices), an area identifier defined by 12 bits (i.e., capable of identifying up to 4096 ports/links provided on the high port density FC switch device 504), and a session identifier defined by 8 bits (i.e., capable of identifying up to 256 sessions required by the conventional session requirement ports/links provided by the FC switch devices.)

As such, each of the FC switch devices 502, 504, and 506 may be associated with unique FC addresses having 4-bit domain identifiers. For example, the FC switch device 502 may be associated with a domain identifier "0x1/4", the FC switch device 504 may be associated with a domain identifier "0x2/4", and the FC switch device 502 may be associated with a domain identifier "0x3/4". Furthermore, the unique FC addresses associated with each of the FC switch devices 502, 504, and 506 will have 12-bit area identifiers ranging from "0x000/12" to "0xFFF/12", allowing for the unique identification of up to 4096 different links/ports on each of those FC switch devices. Finally, unique FC addresses associated with each of the FC switch devices 502, 504, and 506 will have 8-bit session identifiers, allowing for the unique identification of up to 256 different sessions on each link/port provided by those FC switch devices.

Figure 6A:
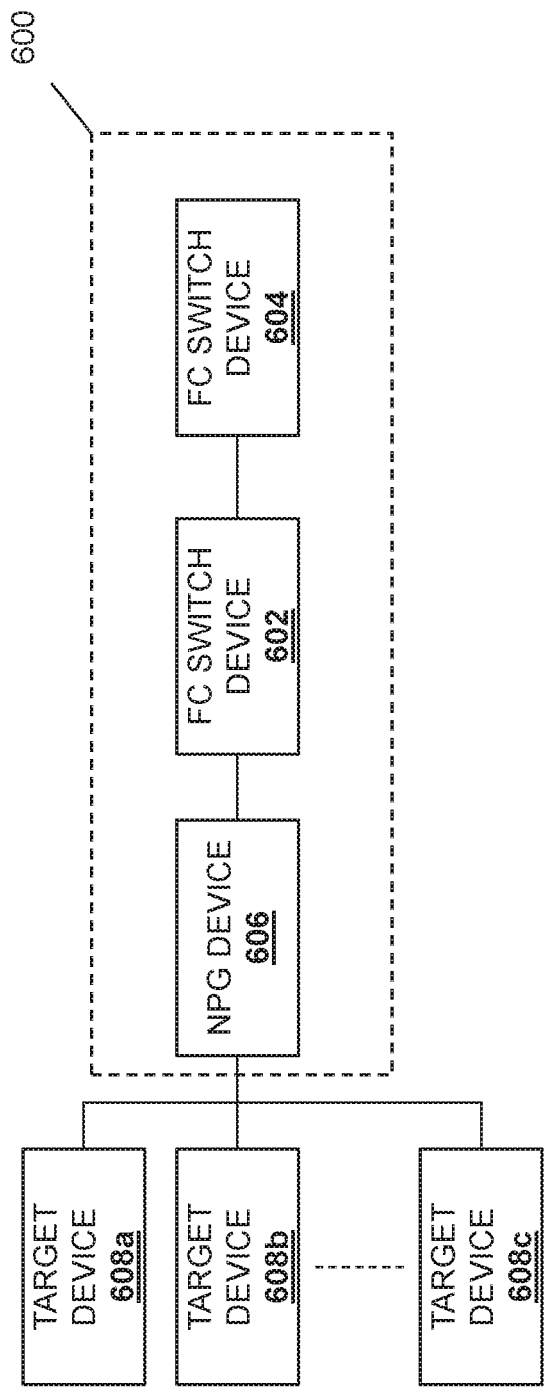
FIG. 6A is a schematic view of a FC switch devices coupled to an NPG device, each of which may be provided unique FC addresses using the variable length field FC address system of the present disclosure.

In another example, FIG. 6A illustrates a portion of an FC fabric 600 (which may be the FC fabric 202 of FIG. 2) that includes a plurality of FC switch devices 602 and 604 (which may be any of the FC switch devices 202a-i of FIG. 2), with the FC switch device 602 coupled to an N_Port Identifier Virtualization (NPIV) Proxy Gateway (NPG) device 606, with the NPG device 606 coupled to a plurality of target devices 608a, 608b, and up to 608c. One of skill in the art in possession of the present disclosure will recognize that NPG devices (which may be considered FC switch devices in some embodiments) may be viewed as a endpoint device from the point of view of the FC fabric, while being viewed as the FC fabric from the point of view of the target devices 608a-c. As such, the NPG device 606 may require a large number of sessions via its link to the FC switch device 602.

At block 406 of the method 400, the session requirements of the link between the FC switch device 602 and the NPG device 606 may be identified as relatively high and requiring more than 256 sessions. For example, the NPG device 606 may be coupled to more than 256 target devices, requiring its link to the FC switch device 602 to provide more than 256 sessions, each of which should be mapped to a session identifier, and thus conventional 8-bit session identifiers utilized in conventional FC address systems are not sufficient to identify each of the sessions required by the link between the FC switch device 602 and the NPG device 606. In response to such session requirements for the link between the FC switch device 602 and the NPG device 606, the FC switch engine 304 in the FC switch device 202a may allocate unique FC address(es) for the FC switch device 602, with each unique FC address having a domain identifier defined by 4 bits (i.e., capable of identifying 16 or fewer FC switch devices in the FC fabric 600), an area identifier defined by 8 bits (i.e., capable of identifying 256 ports/links provided on the FC switch device 602), and a session identifier defined by 12 bits (i.e., capable of identifying up to 4096 sessions required by the link between the FC switch device 602 and the NPG device 606.) Thus, for the target devices 608a-c connected to the NPG device 606 that log in to the FC switch device 602, unique FC addresses may be allocated that include a 4-bit domain identifier of "0x1/4" (identifying the FC switch device 602 in the FC fabric), an 8-bit area identifier of "0x01/8" (identifying the link between the FC switch device 602 and the NPG device 606), and a 12-bit session identifier that may range from "0" to "0xFFFF" (identifying up to 4096 target devices connected to the NPG device 606.)

Furthermore, the FC switch device 604 may not require the relatively large number of session identifiers (e.g., because the FC switch device 604 is not connected to the NPG device 606), so the unique FC addresses allocated to the FC switch device 604 may have their domain identifier, area identifier, and/or session identifier defined by different numbers of bits than are used to define the domain identifier, area identifier, and/or session identifier provided in the unique FC addresses allocated to the FC switch device 602. As would be recognize by one of skill in the art, unique FC addresses for FC switch devices in an FC fabric may include domain identifiers, area identifiers, and/or session identifiers defined by different numbers of bits as long as each FC address remains unique (i.e., identifies a single session provided by a single link on a single FC switch device). For example, the FC switch engine 304 in the FC switch device 202a/300 may allocate the FC switch device 604 unique FC addresses with an 8-bit domain identifier, an 8-bit area identifier, and an 8-bit session identifier while assuring that the values provided by 4-bit domain identifier included in the FC addresses allocated to the FC switch device 602 are not used via the 8-bit domain identifier included in the FC addresses allocated to the FC switch device 604.

In some embodiments, the allocation of the unique FC addresses to the FC switch devices in the FC fabric may include the master FC switch device communicating those unique FC addresses to each of the FC switch device. Subsequently, data packets generated by the source devices 206a-c may be routed through the FC fabric 202 to the target devices 204a-c using those unique FC addresses.

Figure 5B:
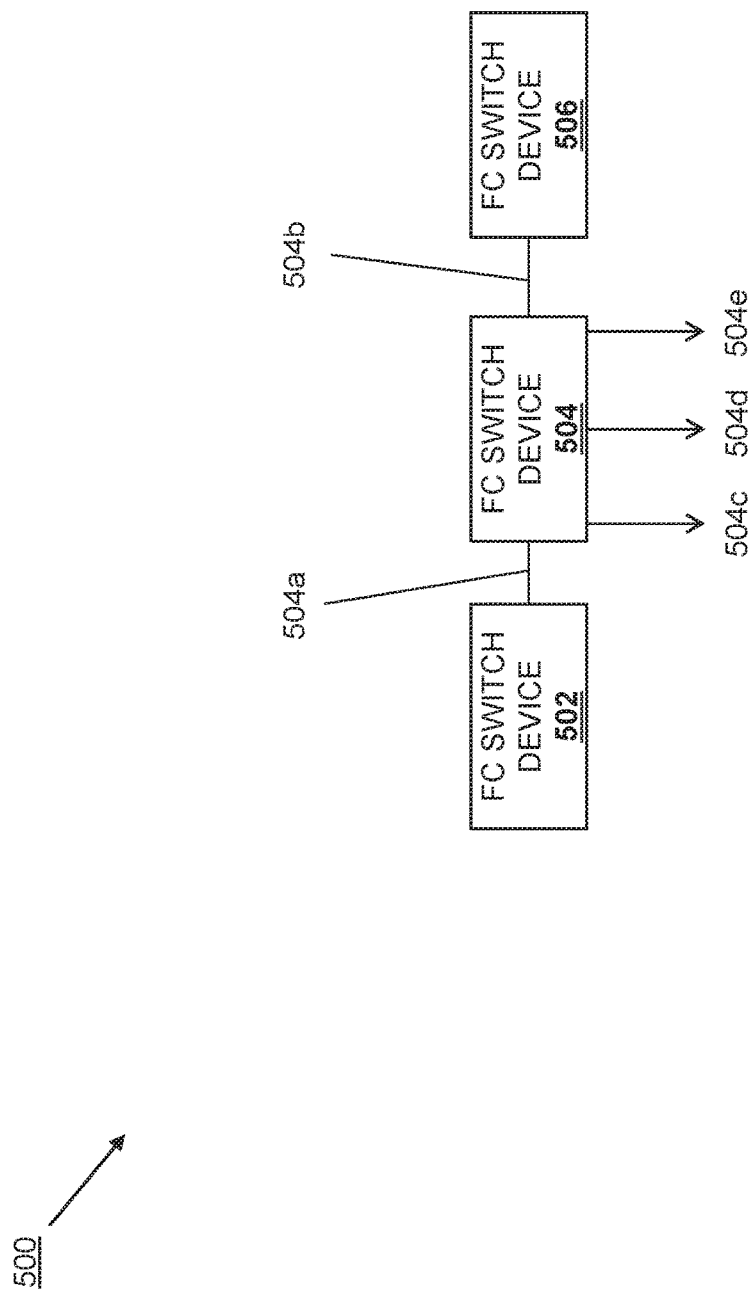
FIG. 5B is a schematic view of one of the FC switch devices of FIG. 5A with links that may be associated in an FC switching table with identifiers in a unique FC address using the variable length field FC address system of the present disclosure.

The variable length field FC addressing scheme described above has an impact on FC frame switching, as conventional FC switch devices are not configured to provide masks and will assume 8-bit domain identifiers in the FC address. As such, a modification may be provided such that the FC switching tables utilized by the FC switch devices in the FC fabric may be configured to support masks such as, for example, for Internet Protocol (IP) networks identified in a destination field (similar mechanisms for network masks may be used in an IP route table). For example, with reference to FIG. 5B, the FC switch device 504 discussed above is illustrated with link 504a to the FC switch device 502, link 504b to the FC switch device 506, and links 504c, 504d, and 504e to respective directly connected devices (not illustrated). In such an embodiment, the FC switching table in the FC switch device 504 for use with the variable length field FC addressing scheme of the present disclosure may look as follows:

| FC ID/Mask | Outgoing Link | Comments |
|---|---|---|
| 0x1/4 | 504a | Devices connected to FC switch 502 |
| 0x3/4 | 504b | Devices connected to FC switch 506 |
| 0x2000/16 | 504c | Directly connected devices on area 0x000/12 in FC switch 504 |
| 0x2001/16 | 504d | Directly connected devices on area 0x001/12 in FC switch 504 |
| 0x2002/16 | 504e | Directly connected devices on area 0x002/12 in FC switch 504 |

Figure 6B:
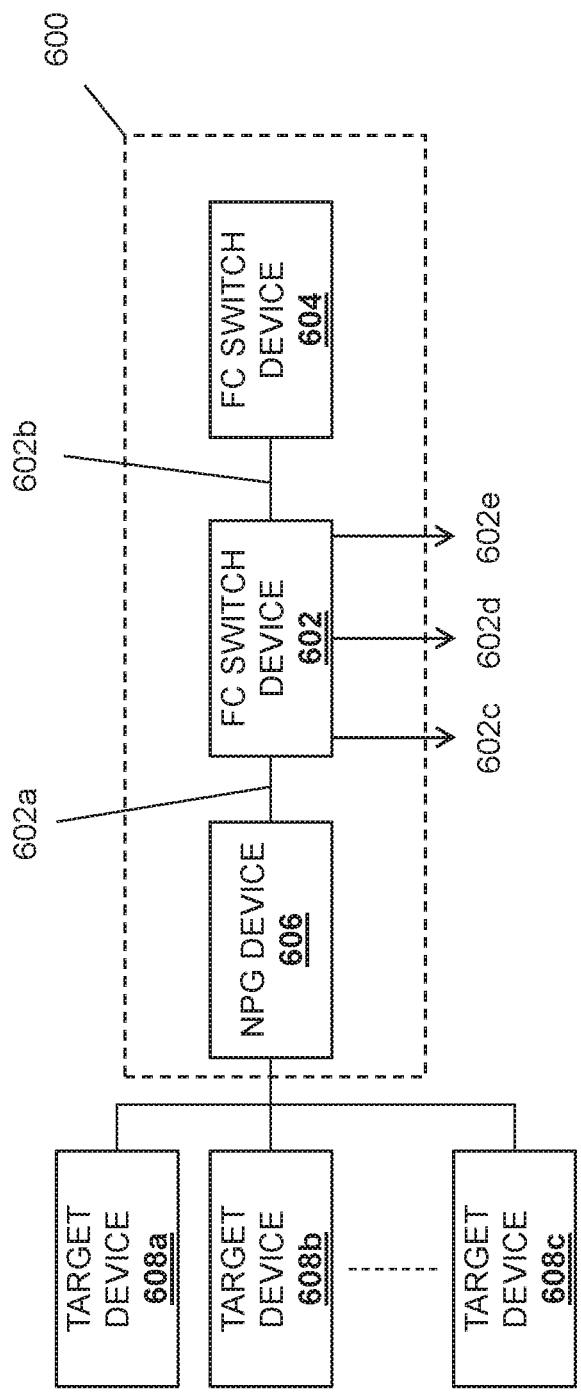
FIG. 6B is a schematic view of one of the FC switch devices of FIG. 6A with links that may be associated in an FC switching table with identifiers in a unique FC address using the variable length field FC address system of the present disclosure.

In another example, with reference to FIG. 6B, the FC switch device 602 discussed above is illustrated with link 602a to the NPG device 606, link 602b to the FC switch device 604, and links 602c, 602d, and 602e to respective directly connected devices (not illustrated). In such an embodiment, the FC switching table in the FC switch device 602 for use with the variable length field FC addressing scheme of the present disclosure may look as follows:

| FC ID/Mask | Outgoing Link | Comments |
| --- | --- | --- |
| 0x101/12 | 602a | Devices connected to NPG device 606 (area 0x01/8) |
| 0x20/8 | 602b | Devices connected to FC switch 604 |
| 0x1000/16 | 602c | Directly connected devices on area 0x000/12 in FC switch 602 |
| 0x1001/16 | 602d | Directly connected devices on area 0x001/12 in FC switch 602 |
| 0x1002/16 | 602e | Directly connected devices on area 0x002/12 in FC switch 602 |

As would be understood by one of skill in the art in possession of the present disclosure, The FC switching table above may be used to route FC frames. For example, when an FC frame is received on one of the ports of an FC switch device, the FC switching table may be utilized to determine to which port that FC frame should be routed. The destination address in the incoming FC frame may be compared against the FC ID/Masks in the table entry, and the FC ID/Mask in a table entry will match the incoming FC frame if the first set of bits identified by a mask field of destination address in the FC frame is same as FC ID/Mask in the table entry.

In addition, with the concept of masking, multiple FC forwarding routes may be compacted to a single FC forwarding route when possible in order to reduce the size of the forwarding tables. For example, the following two FC forwarding route entries may exist:
0x3/4→fc1
0x2/4→fc1

Those two FC forwarding entries may be compacted to "1/3→fc1" without any loss in functionality. Furthermore, during FC fabric formation, domain identifiers may be checked for uniqueness, and such uniqueness checks in the variable length field FC addressing scheme of the present disclosure may also look for overlaps between domain identifiers to ensure uniqueness. For example, two domain identifiers "d1/x" and "d2/y" are overlapping in the below conditions:
1. If x=y, d1=d 2
2. If x>y, $(d1>>2^{(x-y)})=(d2)$
3. If x<y, $(d1)=(d2>>2^{(y-x)})$ Note that $x^y$–x to the power of y, a>>b-a bit wise right shifted by b bits.

Name server queries like "GID_FF", which use domain identifiers and area identifiers, may be extended to handle variable length domain identifiers and area identifiers by including length and variable files in "CT_IU" requests response formats.

Thus, the systems and methods of the present disclosure provide for the allocation of unique FC addresses to each of the FC switch devices in an FC fabric with the domain identifier, area identifier, and/or sessions identifier in any particular unique FC address defined by a variable number of bits depending on the number of FC switch devices in the FC fabric, the number of ports/links provided by the FC switch device associated with that unique FC address, and the number of sessions required by the link provided by the FC switch device associated with that FC address. As such, for any particular FC switch device, a unique FC address may be allocated that includes a domain identifier defined by a first number of bits that is based on the number of FC switch devices in the FC fabric, an area identifier defined by a second number of bits that is based on the number of links/ports that are provided by that FC switch device, and a number of sessions required by the link on that FC switch device for which the FC address is being allocated. Such flexible FC address layouts allow for more bits available in the FC address to be utilized for one or more of the identifiers at the expense of the bits in the FC address utilized for the other identifier(s), changing the convention fixed FC address bit utilization of an 8-bit domain identifier, an 8-bit area identifier, and an 8-bit session identifier to a domain identifier defined by x bits, an area identifier defined by y bits, and a session identifier defined by (24-x-y) bits, which provides enhanced networking design and deployment options in a Fibre Channel toplogy.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A variable length field Fibre Channel (FC) address system, comprising:
   a source device;
   a target device; and
   a Fibre Channel (FC) fabric that couples the source device to the target device, wherein the FC fabric includes a plurality of FC switch devices, and wherein a first FC switch device that is included in the plurality of FC switch devices is configured to:
      identify a number of the plurality of FC switch devices in the FC fabric;
      identify a number of links provided by each FC switch device that is included in the plurality of FC switch devices in the FC fabric;
      identify a number of sessions required by each link provided by each FC switch device that is included in the plurality of FC switch devices in the FC fabric; and
      allocate a plurality of unique FC addresses to the plurality of FC switch devices, wherein each respective unique FC address includes:
         a domain identifier that is provided by a first number of bits based on the number of the plurality of FC switch devices in the FC fabric;
         an area identifier that is provided by a second number of bits based on the number of links provided by an FC switch device that is included in the plurality of FC switch devices and that is associated with that respective unique FC address; and
         a session identifier that is provided by a third number of bits based on the number of sessions required by the link provided by the FC switch device associated with that respective unique FC address.

2. The system of claim 1, wherein at least one of the plurality of unique FC addresses includes the area identifier that is provided by the second number of bits that is greater than each of the first number of bits that are used to provide the domain identifier and the third number of bits that are used to provide the session identifier.

3. The system of claim 1, wherein at least one of the plurality of unique FC addresses includes the session identifier that is provided by the third number of bits that is greater than each of the first number of bits that are used to provide the domain identifier and the second number of bits that are used to provide the area identifier.

4. The system of claim 1, wherein at least one of the plurality of unique FC addresses includes the domain identifier that is provided by the first number of bits that is greater than each of the second number of bits that are used to provide the area identifier and the third number of bits that are used to provide the session identifier.

5. The system of claim 1, wherein at least one of the plurality of unique FC addresses includes the domain identifier that is provided by the first number of bits that is less than each of the second number of bits that are used to provide the area identifier and the third number of bits that are used to provide the session identifier.

6. The system of claim 1, wherein the plurality of unique FC addresses include at least one first unique FC address that includes the domain identifier that is provided by a different number of bits than are used to provide the domain identifier at in at least one second unique FC address included in the plurality of unique FC addresses.

7. An Information Handling System (IHS), comprising:
a processing system; and
a memory system that is coupled to the processing system and that includes instructions that, when executed by the processing system, cause the processing system to provide a Fibre Channel (FC) switch engine that is configured to:
identify a number of FC switch devices in an FC fabric;
identify a number of links provided by each of the number of FC switch devices in the FC fabric;
identify a number of sessions required by each link provided by each of the number of FC switch devices in the FC fabric; and
allocate a plurality of unique FC addresses to each of the number of FC switch devices, wherein each respective unique FC address includes:
a domain identifier that is provided by a first number of bits based on the number of FC switch devices in the FC fabric;
an area identifier that is provided by a second number of bits based on the number of links provided by an FC switch device of the number of FC switch devices that is associated with that respective unique FC address; and
a session identifier that is provided by a third number of bits based on the number of sessions required by the link provided by the FC switch device associated with that respective unique FC address.

8. The IHS of claim 7, wherein at least one of the plurality of unique FC addresses includes the area identifier that is provided by the second number of bits that is greater than each of the first number of bits that are used to provide the domain identifier and the third number of bits that are used to provide the session identifier.

9. The IHS of claim 7, wherein at least one of the plurality of unique FC addresses includes the session identifier that is provided by the third number of bits that is greater than each of the first number of bits that are used to provide the domain identifier and the second number of bits that are used to provide the area identifier.

10. The IHS of claim 7, wherein at least one of the plurality of unique FC addresses includes the domain identifier that is provided by the first number of bits that is greater than each of the second number of bits that are used to provide the area identifier and the third number of bits that are used to provide the session identifier.

11. The IHS of claim 7, wherein at least one of the plurality of unique FC addresses includes the domain identifier that is provided by the first number of bits that is less than each of the second number of bits that are used to provide the area identifier and the third number of bits that are used to provide the session identifier.

12. The IHS of claim 7, wherein the plurality of unique FC addresses include at least one first unique FC address that includes the domain identifier that is provided by a different number of bits than are used to provide the domain identifier at in at least one second unique FC address included in the plurality of unique FC addresses.

13. The IHS of claim 7, wherein the plurality of unique FC addresses include at least one first unique FC address that includes the area identifier that is provided by a different number of bits than are used to provide the area identifier at in at least one second unique FC address included in the plurality of unique FC addresses.

14. A method for providing variable length field Fibre Channel (FC) addresses, comprising:
identifying, by a first Fibre Channel (FC) switch device included in an FC fabric, a number of FC switch devices in the FC fabric;
identifying, by the FC switch device, a number of links provided by each of the number of FC switch devices in the FC fabric;
identifying, by the FC switch device, a number of sessions required by each link provided by each of the number of FC switch devices in the FC fabric; and
allocating, by the FC switch device, a plurality of unique FC addresses to the each of the number of FC switch devices, wherein each respective unique FC address includes:
a domain identifier that is provided by a first number of bits based on the number of FC switch devices in the FC fabric;
an area identifier that is provided by a second number of bits based on the number of links provided by an FC switch device of the number of FC switch devices that is associated with that respective unique FC address; and
a session identifier that is provided by a third number of bits based on the number of sessions required by the link provided by the FC switch device associated with that respective unique FC address.

15. The method of claim 14, wherein at least one of the plurality of unique FC addresses includes the area identifier that is provided by the second number of bits that is greater than each of the first number of bits that are used to provide the domain identifier and the third number of bits that are used to provide the session identifier.

16. The method of claim 14, wherein at least one of the plurality of unique FC addresses includes the session identifier that is provided by the third number of bits that is greater than each of the first number of bits that are used to provide the domain identifier and the second number of bits that are used to provide the area identifier.

17. The method of claim 14, wherein at least one of the plurality of unique FC addresses includes the domain identifier that is provided by the first number of bits that is greater than each of the second number of bits that are used to provide the area identifier and the third number of bits that are used to provide the session identifier.

18. The method of claim 14, wherein at least one of the plurality of unique FC addresses includes the domain identifier that is provided by the first number of bits that is less than each of the second number of bits that are used to provide the area identifier and the third number of bits that are used to provide the session identifier.

19. The method of claim 14, wherein the plurality of unique FC addresses include at least one first unique FC address that includes the domain identifier that is provided by a different number of bits than are used to provide the domain identifier at in at least one second unique FC address included in the plurality of unique FC addresses.

20. The method of claim 14, wherein the plurality of unique FC addresses include at least one first unique FC address that includes the area identifier that is provided by a different number of bits than are used to provide the area identifier at in at least one second unique FC address included in the plurality of unique FC addresses.

* * * * *